US008605918B2

(12) United States Patent
Huang et al.

(10) Patent No.: US 8,605,918 B2

(45) Date of Patent: Dec. 10, 2013

(54) POWER SAVING SYSTEM AND METHOD FOR LOUDSPEAKER

(75) Inventors: Jun Huang, Shenzhen (CN); Yang Zhong, Shenzhen (CN); Ji-Bao Chen, Shenzhen (CN); Kai Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 343 days.

(21) Appl. No.: 13/194,954

(22) Filed: Jul. 31, 2011

(65) Prior Publication Data

US 2012/0288123 A1 Nov. 15, 2012

(51) Int. Cl.
*H02B 1/00* (2006.01)
*H04R 29/00* (2006.01)

(52) U.S. Cl.
USPC ................................ 381/123; 381/58; 381/59

(58) Field of Classification Search
USPC ......... 381/123, 58, 59, 309.9, 286.01, 309.16
See application file for complete search history.

(56) References Cited

U.S. PATENT DOCUMENTS

| | | | | |
|---|---|---|---|---|
| 4,301,330 | A * | 11/1981 | Trump | 381/55 |
| 5,596,311 | A * | 1/1997 | Bess et al. | 340/384.7 |
| 8,155,362 | B2 * | 4/2012 | Chris et al. | 381/334 |
| 2003/0002685 | A1 * | 1/2003 | Werblud | 381/67 |
| 2009/0110206 | A1 * | 4/2009 | Haggis et al. | 381/58 |

* cited by examiner

*Primary Examiner* — Mohammad Islam
*Assistant Examiner* — David Ton
(74) *Attorney, Agent, or Firm* — Altis Law Group, Inc.

(57) ABSTRACT

A power saving system includes a sensor, a processor, a timer, and a switch. The sensor senses movements in the diaphragm of the loudspeaker. The processor determines whether the loudspeaker is power-on and in use or power-on but not in use. The processor further determines whether a preset period of time has elapsed since the indication of power-on but not in use was first given. If the preset period of time has elapsed, the processor further controls the switch to disconnect the power source from the loudspeaker.

6 Claims, 2 Drawing Sheets

POWER SAVING SYSTEM AND METHOD FOR LOUDSPEAKER

BACKGROUND

1. Technical Field

The present disclosure relates to a system and a method for saving power of a loudspeaker.

2. Description of Related Art

When a loudspeaker is not used, users usually forget to power it off. The loudspeaker continues to consume energy however, and if the loudspeaker is on for a long time, its working life will be reduced.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

As is known, when a loudspeaker is powered on and in use, the range of movement of the diaphragm is large, in respect of both amplitude and frequency. When the loudspeaker is powered on but no electronic sound signals is send to the loudspeaker, the range of movement of the diaphragm is non-existent or substantially small. In this embodiment, a determination can be made as to whether the loudspeaker is powered on, and is either being used or is not being used according to the description above.

Figure 1:
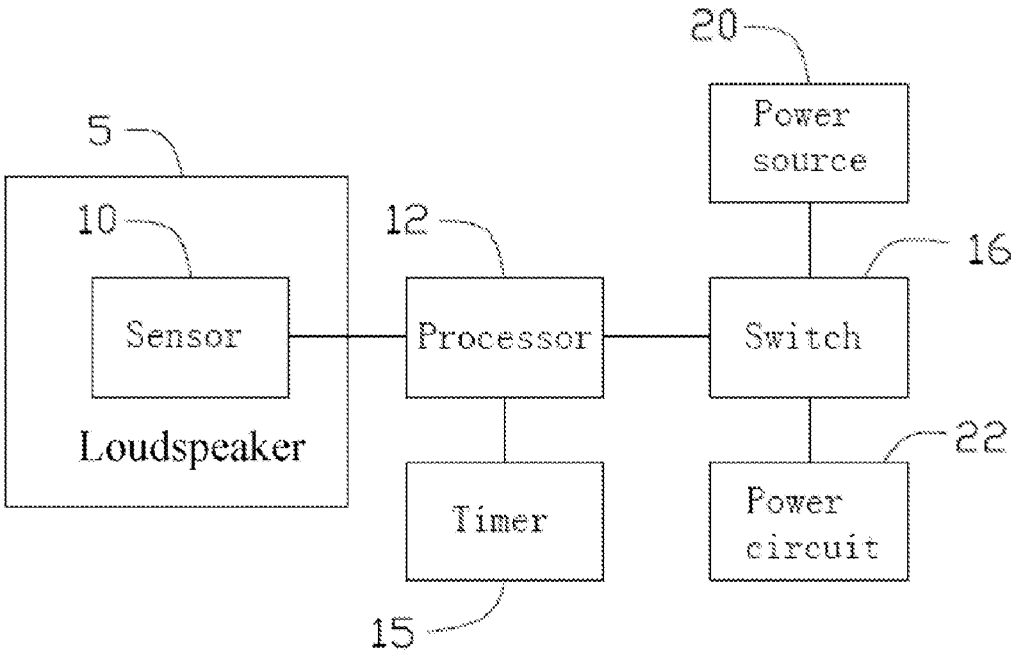
FIG. 1 is a block diagram of an exemplary embodiment of a power saving system for a loudspeaker.

Referring to FIG. 1, an exemplary embodiment of a power saving system for a loudspeaker 5 includes a sensor 10, a processor 12, a timer 15, and a switch 16. The sensor 10 is set in the loudspeaker 5 to sense the movement of the diaphragm. The processor 12 is connected to the sensor 10, to the timer 15, and to the switch 16. The switch 16 is further connected to a power source 20 and a power circuit 22 of the loudspeaker 5.

In the form of corresponding signals, the sensor 10 transmits the diaphragm movements of the loudspeaker 5 to the processor 12. The processor 12 compares every two consecutive signals from the sensor 10 to determine whether the difference between them is greater than a preset value. When the difference between two consecutive signals is less than or equal to the preset value, it indicates that the loudspeaker 5 is powered on but no electronic sound signals is send to the loudspeaker 5. At this time, the processor 12 outputs a time signal to the timer 15 to activate the timer 15 as the processor 12 continues to compare signals. If the difference between two consecutive signals is greater than the preset value, it indicates that the loudspeaker 5 is in use and the processor 12 outputs a stop signal to the timer 15, which causes it to stop and reset.

As the timer 15 is running, the processor 12 determines whether the timer 15 has been running for a preset period of time. If the timer 15 has been running for the preset period of time, the processor 12 outputs a signal to the switch 16. The switch 16 disconnects the power source 20 from the power circuit 22 of the loudspeaker 5, thus powering off the loudspeaker 5.

Figure 2:
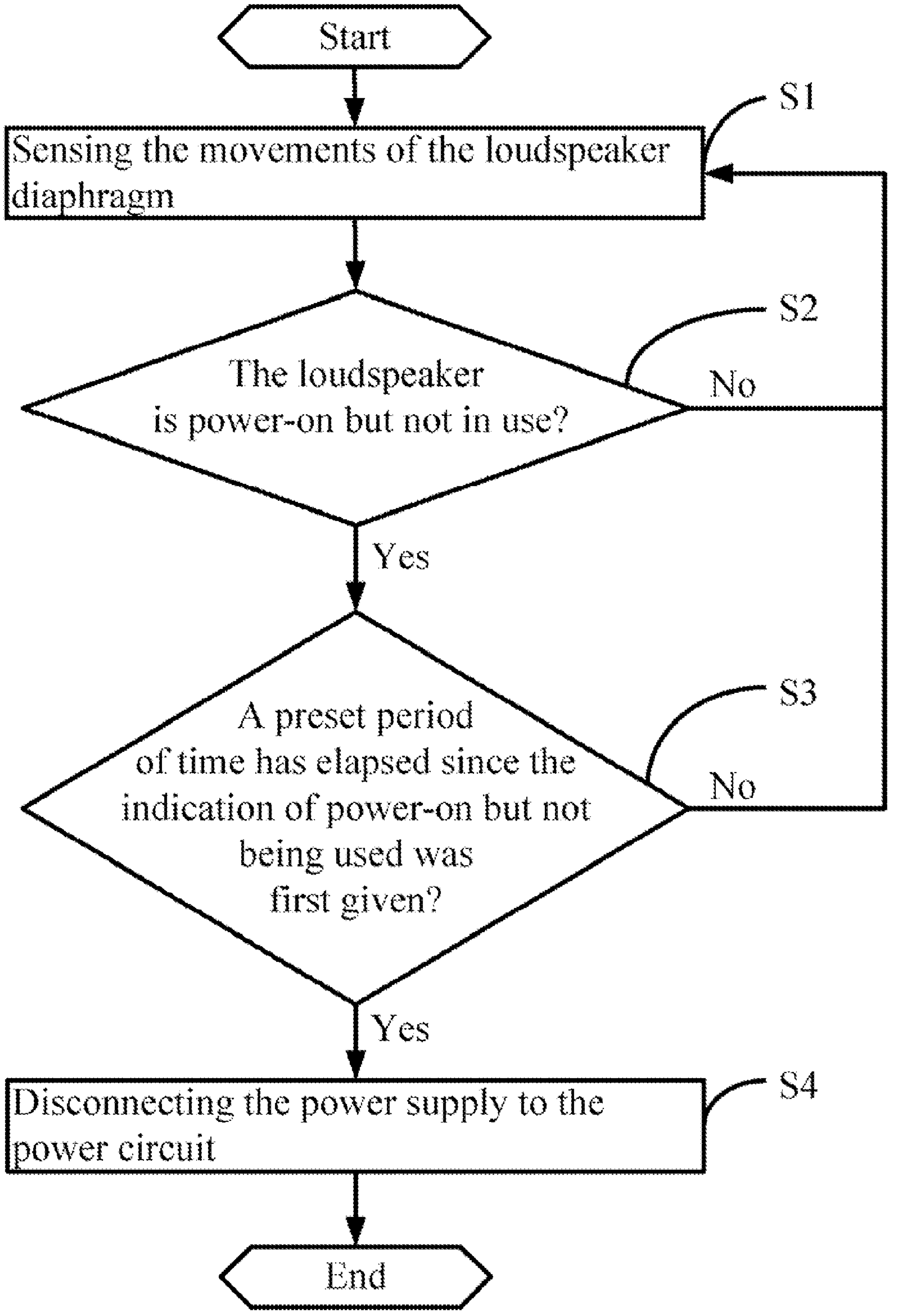
FIG. 2 is a flowchart of an exemplary embodiment of a power saving method for a loudspeaker.

Referring to FIG. 2, an exemplary embodiment of a power saving method for a loudspeaker 5 includes the following steps.

In step S1, when the loudspeaker 5 is powered on, the sensor 10 senses the movements of the loudspeaker diaphragm and transmits signals corresponding to the movements to the processor 12.

In step S2, the processor 12 determines whether power is being supplied to the loudspeaker 5, and whether the loudspeaker 5 is in use, or is not in use according to the signals being received from the sensor 10. If the loudspeaker 5 is powered on and in use, it returns to step S1. If the loudspeaker 5 is powered on but no electronic sound signals is send to the loudspeaker 5, it flows to step S3.

In the embodiment, the processor 12 compares every two signals received consecutively from the sensor 10 to determine whether a difference greater than a preset value exists between them. If the difference between them is less than or equal to the preset value, it indicates that the loudspeaker 5 is powered on but no electronic sound signals is send to the loudspeaker 5. If the difference between the two signals is greater than the preset value, it indicates that the loudspeaker 5 is powered on and is in use.

In step S3, the processor 12 determines whether a preset period of time has elapsed since the indication of power-on but not being used was first given. If the preset period of time has elapsed, it flows to step S4, if not, it returns to step S1.

In the embodiment, when the difference between the two consecutive signals is less than or equal to the preset value, the processor 12 outputs a signal to the timer 15 to activate the timer 15 as it continues to compare signals. If the difference between signals is greater than the preset value, it indicates that the loudspeaker 5 is used, and the processor 12 outputs a signal to stop the timer 15. The timer 15 stops timing and is reset. Moreover, at any time when the timer 15 is running, the processor 12 determines whether a preset time has elapsed.

In step S4, the processor 12 outputs a signal to the switch 16. The switch 16 disconnects the power source 20 from the power circuit 22 of the loudspeaker 5, thus powering off the loudspeaker 5.

The foregoing description of the exemplary embodiments of the disclosure has been presented only for the purposes of illustration and description and is not intended to be exhaustive or to limit the disclosure to the precise forms disclosed. Many modifications and variations are possible in the light of the information above. The embodiments were chosen and described in order to explain the principles of the disclosure and their practical application so as to enable those of ordinary skill in the art to utilize the disclosure and other various embodiments with such various modifications as are suited to the particular use contemplated. Alternative embodiments will be apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A power saving system used for a loudspeaker, the power saving system comprising:

a sensor set in the loudspeaker to sense the movements of a diaphragm of the loudspeaker;

a processor to receive the diaphragm movements from the sensor, thereby determining whether the loudspeaker is power-on but not in use;

a timer, wherein the processor further determines whether a preset period of time has elapsed since the indication of power-on but not in use was first given by the timer; and a switch connected to a power source and a power circuit of the loudspeaker, wherein when the preset period of time has elapsed since the indication of power-on but not in use was first given, the processor further controls the switch to disconnect the power source from the power circuit.

2. The power saving system of claim 1, wherein the processor compares every two consecutive diaphragm movements received from the sensor to determine whether a difference between the two consecutive diaphragm movements is greater than a preset value, if the difference between the two consecutive diaphragm movements is less than or equal to the preset value, a determination is made that the loudspeaker is power-on but not in use.

3. The power saving system of claim 1, wherein if the loudspeaker is power-on but not in use, the processor outputs a time signal to the timer to start the timer; if the loudspeaker is power-on and in use, the processor outputs a stop signal to stop the timer; as the timer is running, the processor determines whether the timer has been running for a preset period of time to determine whether the preset period of time has elapsed since the indication of power-on but not in use was first given.

4. A power saving method used for a loudspeaker, the power saving method comprising:

sensing the movements of a diaphragm of the loudspeaker and transmitting the diaphragm movements to a processor;

the processor determining whether the loudspeaker is power-on but not in use according to the diaphragm movements received from the sensor;

the processor determining whether a preset period of time has elapsed since the indication of power-on but not in use was first given; and disconnecting a power source from the loudspeaker if the preset period of time has elapsed since the indication of power-on but not in use was first given.

5. The power saving method of claim 4, wherein the step of the processor determining whether the loudspeaker is power-on but not in use according to the diaphragm movements received from the sensor comprises:

comparing every two consecutive diaphragm movements received from the sensor to determine whether a difference between the two consecutive diaphragm movements is greater than a preset value;

if the difference is less than or equal to the preset value, a determination is made that the loudspeaker is power-on but not in use; and if the difference is greater than the preset value, a determination is made that the loudspeaker is power-on and in use.

6. The power saving method of claim 4, wherein the step of the processor determining whether a preset period of time has elapsed since the indication of power-on but not in use was first given comprises:

if the loudspeaker is power-on but not in use, the processor outputs a time signal to start the timer;

if the loudspeaker is power-on and in use, the processor outputs a stop signal to stop the timer; and as the timer is running, if a preset time has elapsed, a determination is made that the preset period of time has elapsed since the indication of power-on but not in use was first given.

* * * * *